(12) United States Patent
Ramaswamy et al.

(10) Patent No.: US 12,719,327 B2
(45) Date of Patent: Aug. 25, 2026

(54) E-MACHINE SYSTEM WITH STATOR MEMBER HAVING ISOLATOR BARRIER MEMBERS AND END FLUID DEFLECTOR MEMBER

(71) Applicant: Garrett Transportation I Inc., Torrance, CA (US)

(72) Inventors: Srinidhi Payyur Ramaswamy, Bengaluru (IN); Kishor Kumar K, Bengaluru (IN); Praveen Kumar, Bengaluru (IN)

(73) Assignee: Garrett Transportation I Inc., Torrance, CA (US)

( * ) Notice: Subject to any disclaimer, the term of this patent is extended or adjusted under 35 U.S.C. 154(b) by 173 days.

(21) Appl. No.: 18/604,785

(22) Filed: Mar. 14, 2024

(65) Prior Publication Data

US 2025/0246964 A1 Jul. 31, 2025

(30) Foreign Application Priority Data

Jan. 29, 2024 (IN) ............................ 202411005829

(51) Int. Cl.
*H02K 3/52* (2006.01)
*B60H 1/32* (2006.01)

(52) U.S. Cl.
CPC ........... *H02K 3/522* (2013.01); *B60H 1/3222* (2013.01); *B60H 2001/3292* (2013.01); *H02K 2203/12* (2013.01)

(58) Field of Classification Search
CPC ........... H02K 3/24; H02K 3/34; H02K 3/345; H02K 3/522; H02K 9/10; H02K 9/12;
(Continued)

(56) References Cited

U.S. PATENT DOCUMENTS 1,231,620 A 7/1917 Kuyser
5,717,273 A 2/1998 Gulbrandson et al.
(Continued)

FOREIGN PATENT DOCUMENTS

DE 102019120340 A1 1/2021
JP 2016200122 A * 12/2016
(Continued)

OTHER PUBLICATIONS

Takano, Machine Translation of JP2016200122, Dec. 2016 (Year: 2016).*

(Continued)

*Primary Examiner* — Eric Johnson
(74) *Attorney, Agent, or Firm* — BelayIP

(57) ABSTRACT

A stator member for a directly-cooled e-machine includes a bobbin with a plurality of winding supports, a first isolator barrier member supported on a first angular side of a first winding support and a second isolator barrier member supported on a second angular side of the first winding support. The first and second isolator barrier members, the inner radial portion, and the outer radial portion cooperatively define an axial flow channel. The stator member further includes an end fluid deflector member that defines a redirection surface of the axial flow channel. The redirection surface is configured to redirect flow at the first axial end substantially from a first direction along the axis toward a second direction along the axis. The first direction is opposite the second direction.

20 Claims, 7 Drawing Sheets

(58) Field of Classification Search
CPC ........ H02K 9/14; H02K 9/16; H02K 2203/12; B60H 1/3222; B60H 1/3226; B60H 2001/3292
See application file for complete search history.

(56) References Cited

U.S. PATENT DOCUMENTS

| | | | |
|---|---|---|---|
| 10,199,903 | B2 | 2/2019 | Grau Sorarrain et al. |
| 10,298,081 | B2 | 5/2019 | Mokhadkar et al. |
| 11,581,770 | B2 | 2/2023 | Bell |
| 2015/0207386 | A1 | 7/2015 | Garrard et al. |
| 2020/0018300 | A1* | 1/2020 | Guntermann ....... F04C 29/0085 |
| 2020/0366149 | A1 | 11/2020 | Walisko et al. |
| 2022/0109344 | A1 | 4/2022 | Odedra et al. |

FOREIGN PATENT DOCUMENTS

| | | | |
|---|---|---|---|
| JP | 2022080466 | A * | 5/2022 |
| WO | 2018189523 | A1 | 10/2018 |

OTHER PUBLICATIONS

Watanabe, Machine Translation of JP2022080466, May 2022 (Year: 2022).*

* cited by examiner 550
550
554
479
418
477
477
475
231
212

E-MACHINE SYSTEM WITH STATOR MEMBER HAVING ISOLATOR BARRIER MEMBERS AND END FLUID DEFLECTOR MEMBER

CROSS-REFERENCE TO RELATED APPLICATIONS

The present application claims priority to Indian Provisional Patent Application No. 202411005829, filed Jan. 29, 2024, the entire disclosure of which is incorporated herein by reference.

TECHNICAL FIELD

The technical field generally relates to an e-machine system and, more particularly, relates to an e-machine system with a stator member having isolator barrier members and an end fluid deflector member for a fluid-cooled e-machine.

BACKGROUND

Turbomachines may be useful for operation of vehicles and other systems. HVAC systems, for example, may include a compressor-type turbomachine that provides temperature-controlled air to a passenger compartment of a vehicle.

Preferably, turbomachines like the compressor of the HVAC system operate at high efficiency in a variety of conditions. Also, these devices are preferably compact and lightweight. Moreover, these turbomachines preferably have a low part count, are relatively easy to make and assemble, and/or provide other manufacturing efficiencies. The turbomachine may include an e-machine, such as an electric motor and/or electric generator. Preferably, the e-machine is preferably a high-efficiency device, the e-machine is compact, it has a low part count, and the e-machine may be manufactured efficiently as well.

However, some existing e-machines configured for turbomachines operate inefficiently in some conditions. The e-machine may suffer from electro-magnetic losses, which negatively affects efficiency. Also, high operating temperatures may have a disadvantageous effect on the e-machine operation. Furthermore, some turbomachines and the e-machine included therein may be bulky, may be difficult to manufacture, assemble, maintain, etc.

Accordingly, there remains a need for a turbomachine that operates at high efficiency and that has a relatively low weight, size, and part count. Furthermore, there remains a need for such a turbomachine that also provides manufacturing efficiencies.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a stator member for a directly-cooled e-machine is disclosed. The stator member includes a bobbin with a plurality of winding supports arranged about an axis. The bobbin includes a first axial end and a second axial end spaced apart along the axis. The plurality of winding supports include a first winding support. The first winding support includes an inner radial portion, an outer radial portion, and an intermediate portion defined radially between the inner radial portion and the outer radial portion with respect to the axis. The stator member also includes a first isolator barrier member supported on a first angular side of the first winding support and a second isolator barrier member supported on a second angular side of the first winding support. The first and second isolator barrier members extend radially between the inner radial portion and the outer radial portion and between the first axial end and the second axial end. The first isolator barrier member, the inner radial portion, the second isolator barrier member, and the outer radial portion cooperatively define an axial flow channel extending through the bobbin between the first axial end and the second axial end. The stator member further includes an end fluid deflector member that is supported proximate the first axial end to define a redirection surface of the axial flow channel. The redirection surface is configured to redirect flow at the first axial end substantially from a first direction along the axis toward a second direction along the axis. The first direction is opposite the second direction.

In another embodiment, a turbomachine is disclosed that includes a housing assembly and a rotating group supported for rotation about an axis within the housing assembly. The turbomachine also includes an e-machine that is operable as at least one of an electric motor and an electric generator, the e-machine housed within the housing assembly and operatively coupled to the rotating group, the e-machine configured to attach within a fluid system that provides a fluid coolant thereto. Furthermore, the turbomachine includes a stator member of the e-machine that includes a bobbin with a plurality of winding supports arranged about an axis. The bobbin includes a first axial end and a second axial end spaced apart along the axis. The plurality of winding supports include a first winding support. The first winding support includes an inner radial portion, an outer radial portion, and an intermediate portion defined radially between the inner radial portion and the outer radial portion with respect to the axis. Moreover, the stator member includes a first isolator barrier member supported on a first angular side of the first winding support and a second isolator barrier member supported on a second angular side of the first winding support. The first and second isolator barrier members extend radially between the inner radial portion and the outer radial portion and between the first axial end and the second axial end. The first isolator barrier member, the inner radial portion, the second isolator barrier member, and the outer radial portion cooperatively define an axial flow channel extending through the bobbin between the first axial end and the second axial end. The stator member further includes an end fluid deflector member that is supported proximate the first axial end to define a redirection surface of the axial flow channel. The redirection surface is configured to redirect flow at the first axial end substantially from a first direction along the axis toward a second direction along the axis. The first direction is opposite the second direction.

In a further embodiment, a method of manufacturing a turbomachine is disclosed that includes providing a housing, providing a rotating group, and providing an e-machine including providing a stator bobbin. The method further includes supporting the rotating group for rotation about an axis within the housing. The method further includes housing the e-machine within the housing and operably coupling the e-machine to the rotating group to be operable as at least one of an electric motor and an electric generator. The stator bobbin member of the e-machine includes a bobbin with a plurality of winding supports arranged about an axis. The bobbin includes a first axial end and a second axial end spaced apart along the axis. The plurality of winding supports includes a first winding support. The first winding support includes an inner radial portion, an outer radial portion, and an intermediate portion defined radially between the inner radial portion and the outer radial portion with respect to the axis. Also, the bobbin includes a first isolator barrier member supported on a first angular side of the first winding support and a second isolator barrier member supported on a second angular side of the first winding support. The first and second isolator barrier members extend radially between the inner radial portion and the outer radial portion and between the first axial end and the second axial end. The first isolator barrier member, the inner radial portion, the second isolator barrier member, and the outer radial portion cooperatively define an axial flow channel extending through the bobbin between the first axial end and the second axial end. Still further, the bobbin includes an end fluid deflector member that is supported proximate the first axial end to define a redirection surface of the axial flow channel. The redirection surface is configured to redirect flow at the first axial end substantially from a first direction along the axis toward a second direction along the axis, and the first direction is opposite the second direction.

Furthermore, other desirable features and characteristics of the present disclosure will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure, which is defined by the claims. Furthermore, there is no intention to be bound by any expressed or implied theory presented in the preceding technical field, background, brief summary, or the following detailed description.

Broadly, example embodiments disclosed herein include a bobbin for an e-machine, such as an e-machine provided for a fluid compressor device or other turbomachine. The bobbin may include an outer radial surface that includes a first end and a second end that are separated along the axis. On and/or proximate the first end, on the outer radial surface, the bobbin may include one or more winding retainers that are configured for receiving, routing, and/or retaining an end segment of windings of the stator of the e-machine. The winding retainers may provide convenience and may make the windings neat and compact. On and/or proximate the second end on the outer radial surface, the bobbin may include one or more contoured flow surfaces. The e-machine may be configured for receiving a flow of coolant, and the contoured flow surfaces may direct fluid coolant across, over, and through the e-machine for direct cooling. Accordingly, the e-machine may be effectively cooled for high efficiency operation. The e-machine and the turbomachine may also be manufactured efficiently.

Figure 1:
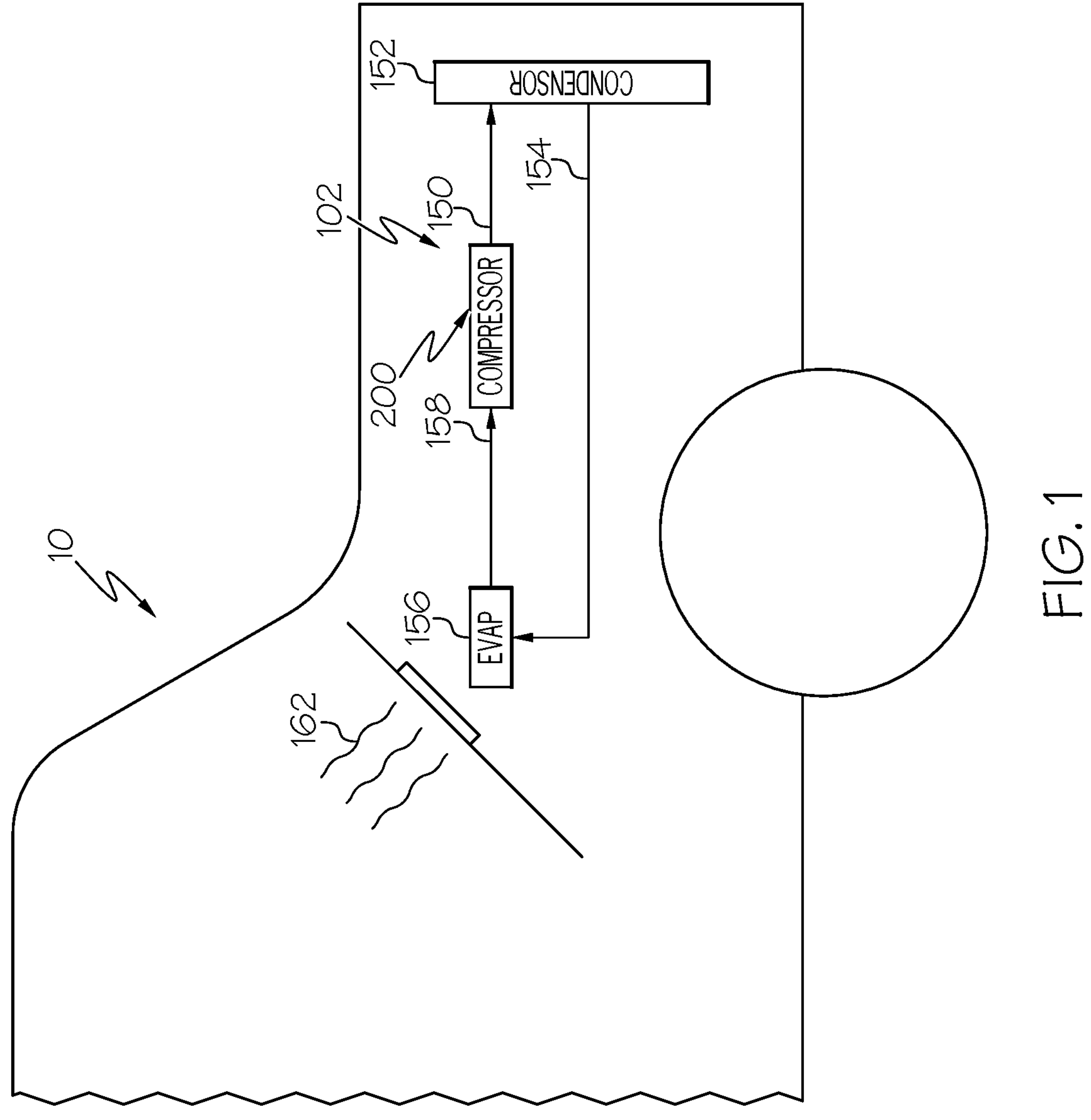
FIG. 1 is a schematic illustration of a fluid system with a compressor device according to example embodiments of the present disclosure.

FIG. 1 is a schematic view of front end of a vehicle 10, such as a passenger car. The vehicle 10 may include a fluid system 102, such as a coolant fluid system, an air conditioning system, refrigerant cycle for an HVAC system, etc. The fluid system 102 may include a compressor device 200 configured according to example embodiments of the present disclosure. The compressor device 200 may compress a working fluid, such as a fluid refrigerant, and the pressurized fluid stream 150 may flow toward a condenser 152 of the fluid system 102. The condenser 152 may exchange heat with a surrounding fluid, and a resulting fluid stream 154 may flow toward an evaporator 156. The evaporator 156 may also be configured for heat exchange with a surrounding fluid, and the evaporator 156 may provide a resulting input flow 158 back to the compressor device 200.

It will be appreciated that the evaporator 156 and/or condenser 152 may be operatively coupled to one or more fans (not shown) for enhancing heat transfer with the surrounding fluid. It will also be appreciated that the fluid system 102 may include other standard components, such as an expansion valve, drier, etc. for use as the working fluid moves through the thermodynamic cycle within the fluid system 102.

In the embodiment illustrated, the evaporator 156 may be used to provide temperature-controlled air 162 to the cabin of the vehicle 10. In some embodiments, the fluid system 102 may be provided in an electric vehicle, a solar-powered car, a fuel-cell vehicle, or other vehicle 10.

The compressor device 200 may be a turbomachine that includes one or more features of the present disclosure. The compressor device 200 may be configured differently, may be incorporated within a different system, or may otherwise differ from the illustrated embodiments without departing from the scope of the present disclosure. Furthermore, features of the present disclosure may be included on a different turbomachine, such as an electric motor-assisted turbocharger, without departing from the scope of the present disclosure.

Figure 2:
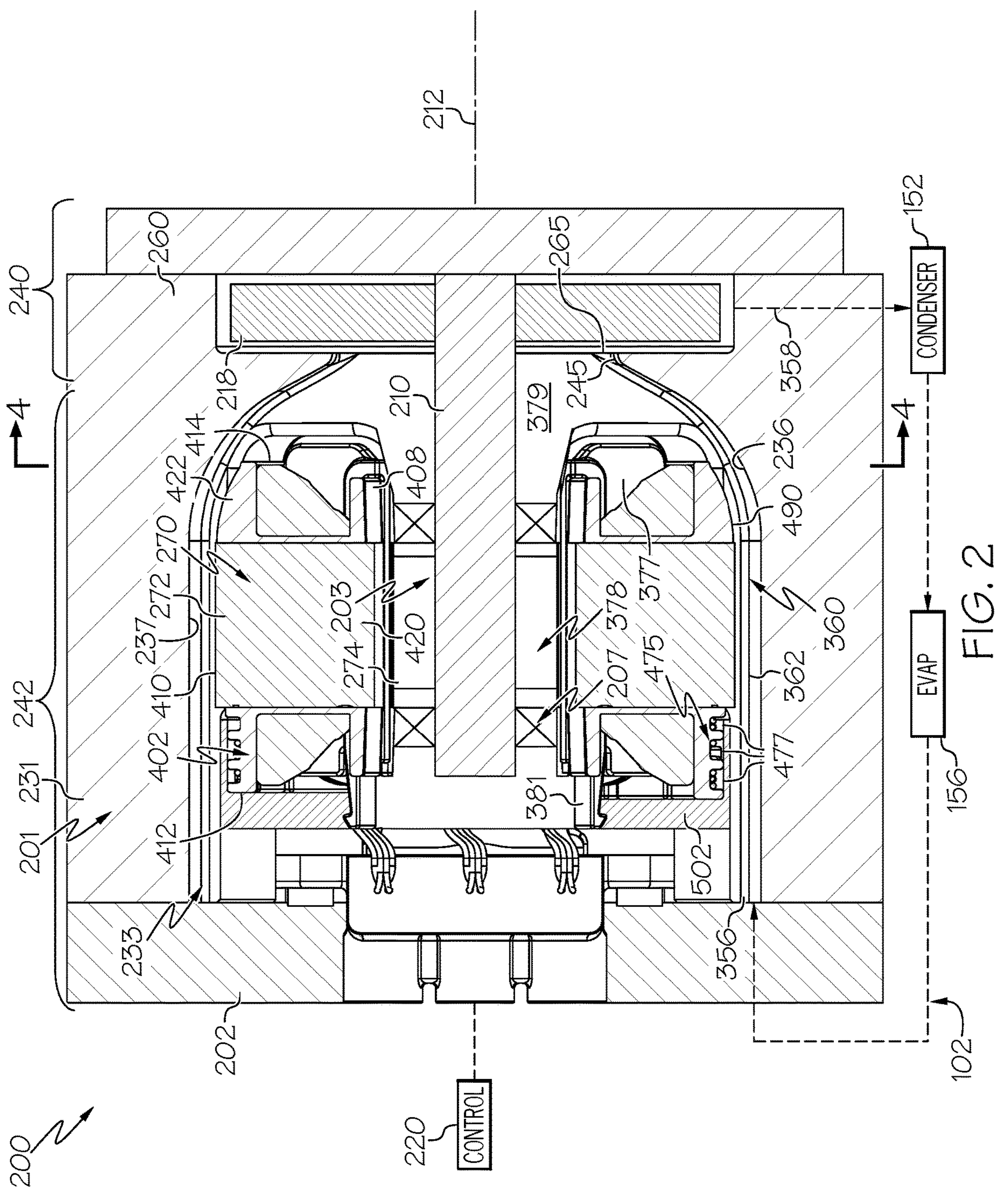
FIG. 2 is a longitudinal cross-sectional view of a turbomachine, such as the compressor device of FIG. 1, configured according to example embodiments of the present disclosure.

The compressor device 200 is illustrated according to example embodiments in FIGS. 2-7. Referring initially to FIG. 2, the compressor device 200 may generally include a housing assembly 201 and a rotating group 203. The rotating group 203 may be supported for rotation within the housing assembly 201 about an axis 212 of rotation by a bearing system 207.

The bearing system 207 may be of any suitable type, such as a fluid bearing (i.e., air bearing, etc.). Accordingly, the bearing system 207 may include one or more journal members that supports the rotating group 203 against radial loading and one or more thrust members that support the rotating group 203 against axial loading, thereby supporting the rotating group 203 for rotation about the axis 212. It will be appreciated, however, that the bearing system 207 may be configured differently to include, for example, a rolling element bearing in additional embodiments of the present disclosure.

The rotating group 203 may include a shaft 210, which is elongate and which extends along the axis 212. The shaft 210 may be substantially centered on the axis 212. In some embodiments, an outer diameter surface of the shaft 210 may be supported by one or more components of the bearing system 207 for rotation relative to the housing assembly 201. The rotating group 203 may also include a wheel 218, such as a compressor wheel 218. The compressor wheel 218 may include a plurality of blades that radiate with respect to the axis 212. The compressor wheel 218 may be fixedly attached and supported on one end of the shaft 210 for rotation therewith.

The housing assembly 201 may include a compressor housing 260 that is shaped and configured according to the compressor wheel 218. As represented in FIG. 2, the compressor housing 260 may surround and house the compressor wheel 218. Together with the wheel 218, the compressor housing 260 may cooperatively define a compressor stage 240 of the compressor device 200 for compressing a working fluid flowing therethrough as will be discussed in detail.

The housing assembly 201 may additionally include an e-machine housing 231. The e-machine housing 231 may be hollow with an interior surface 237 included therein. The interior surface 237 may define a cylindrical e-machine cavity 233 therein. The e-machine housing 231 may be arranged end-to-end along the axis 212 adjacent the compressor housing 260. In some embodiments, at least part of the e-machine housing 231 and at least part of the compressor housing 260 may be defined by a single part such that the e-machine housing 231 and compressor housing 260 are at least partly integrally attached.

Moreover, the compressor device 200 may include an e-machine 270. The e-machine 270 may include a stator member 272 and a rotor member 274. The rotor member 274 may be supported on the shaft 210 and may be surrounded by the stator member 272. The stator member 272 may be fixedly attached and supported within the e-machine cavity 233 of the e-machine housing 231. Thus, the e-machine 270 and the e-machine housing 231 may define an e-machine stage 242 of the compressor device 200.

In some embodiments, the e-machine 270 may be configured to operate as an electric motor, and the e-machine 270 drives the shaft 210 and the compressor wheel 218 in rotation about the axis 212. Thus, fluid that flows through the compressor stage 240 may be compressed to provide the pressurized fluid stream 150 toward the condenser 152 (FIG. 1). In additional embodiments, the e-machine 270 may be configured to operate as a generator such that the e-machine 270 converts rotational energy of the shaft 210 into electric energy. In further embodiments, the e-machine 270 may operate as an electric motor in some conditions and may operate as an electric generator in other conditions.

The e-machine 270, other components of the compressor device 200, and/or features of the fluid system 102 may be controlled by a control system 220. The control system 220 may be a computerized control system and may include a processor, a sensor system, a memory device, and/or additional known components. The control system 220 may be part of a larger vehicle control system that controls additional systems of a vehicle (e.g., engine systems, steering systems, etc.). In some embodiments, the control system 220 may, at least, control the angular velocity of the shaft 210 about the axis 212.

In some embodiments, the compressor device 200 may be "directly cooled" such that a fluid coolant flows through the e-machine cavity 233. The coolant may flow across the e-machine 270, for example, to remove heat from the stator member 272 and/or other portions of the compressor device 200. In some embodiments, the compressor device 200 may be operably connected to the fluid system 102 (FIG. 1), and the working fluid may flow through the e-machine 270 as it circulates through the fluid system 102. In some embodiments, the e-machine stage 242 may be fluidly connected in-series with the compressor stage 240. For example, the compressor stage 240 may be disposed downstream of the e-machine stage 242. One or more fluid passages, pathways, channels, apertures, etc. may define a respective flow path through the compressor stage 240 and further downstream through the compressor stage 240. The working fluid (e.g., in a gaseous state) may flow through the e-machine stage 242 and then flow further downstream through the compressor stage 240.

The housing assembly 201 may include at least one fluid inlet 356 and at least one fluid outlet 358. In some embodiments, the e-machine housing 231 may include at least one fluid inlet 356 extending from outside the e-machine housing 231 and into the cavity 233 therein. The compressor housing 260 may also include at least one fluid outlet 358 configured to outlet fluid away from the compressor wheel 218.

The compressor device 200 may also define at least one flow path 360 (i.e., flow channels, passageways, etc.) through which a fluid may flow from the inlet 356 to the outlet 358. In some embodiments, there may be a plurality of discrete flow paths 360 extending from the inlet 356 to the outlet 358. The flow path 360 may be nonlinear in some embodiments. As will be discussed, the fluid coolant, the working fluid, etc. circulating through the fluid system 102 may also flow through the e-machine housing 231, for example, to cool the e-machine 270.

Figure 3:
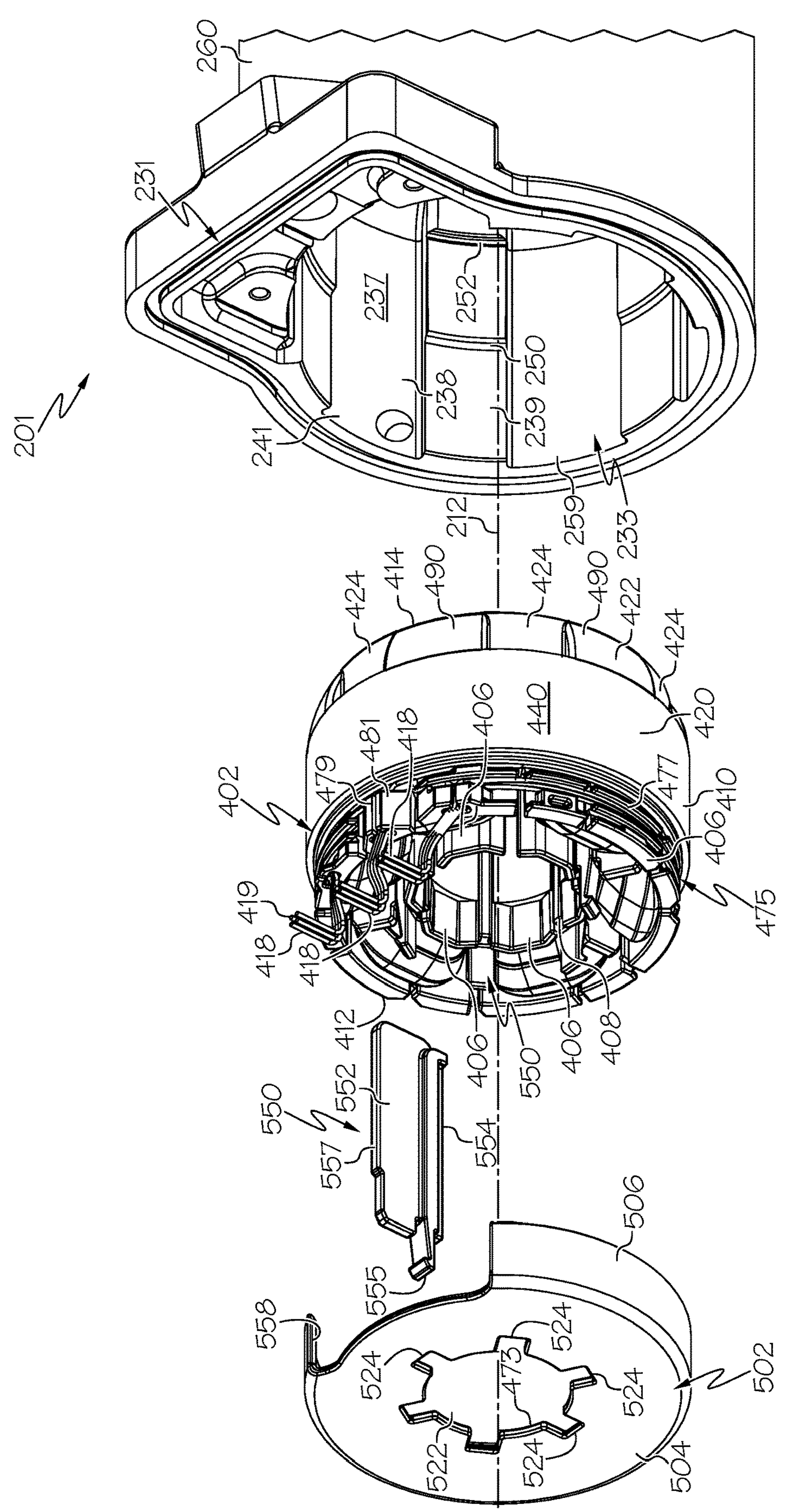
FIG. 3 is an exploded perspective view of the turbomachine of FIG. 2.

Referring now to FIGS. 2 and 3, additional features of the compressor device 200 will be discussed. The e-machine housing 231 is shown in detail in FIG. 3 according to example embodiments. As shown, the e-machine cavity 233 and the interior surface 237 of the e-machine housing 231 may include an open end 241. The open end 241 may be radially wide enough to provide access and passage of the stator member 272 of the e-machine 270 into and out of the e-machine cavity 233. The interior surface 237 of the e-machine housing 231 may further include a constricted second end 245. The second end 245 may gradually taper inward toward the axis 212 as the second end 245 extends toward the compressor housing 260.

The interior surface 237 of the e-machine housing 231 may comprise a base portion 238 and a plurality of longitudinal strips 239. The base portion 238 may define a maximum radial dimension of the interior surface 237. The longitudinal strips 239 may be raised areas of the interior surface 237 that are projected inwardly from the base portion 238 of the interior surface 237. Each strip 239 may extend longitudinally along the axis 212. The strips 239 may be spaced apart at equal angular positions about the axis 212. Accordingly, there may be a plurality of gaps 259 defined between respective neighboring pairs of the strips 239. Stated differently, the gaps 259 may be defined by the base portion 238 of the interior surface 237 between neighboring ones of the strips 239.

In some embodiments, at least one strip 239 may be stepped inwardly as the strip 239 extends further along the axis 212 from end 241 to the second end 245. More specifically, proximate the open end 241, the strip 239 may be projected somewhat inwardly toward the axis 212 from the base portion 238. Further along the axis 212 toward the compressor housing 260, the strip 239 may include a first step 250 and may project further inwardly toward the axis 212. Still further along the axis 212 toward the compressor housing 260, the strip 239 may include a second step 252 and may project still further inwardly toward the axis 212.

The interior surface 237 may be shaped, dimensioned, contoured, etc. according to the exterior of the stator member 272 of the e-machine 270. Thus, the stator member 272 may nest against the interior surface 237 to be supported within the e-machine cavity 233. In some embodiments, the interior surface 237 may include features that define flow channels for the fluid system 102 as will be discussed.

Figure 6:
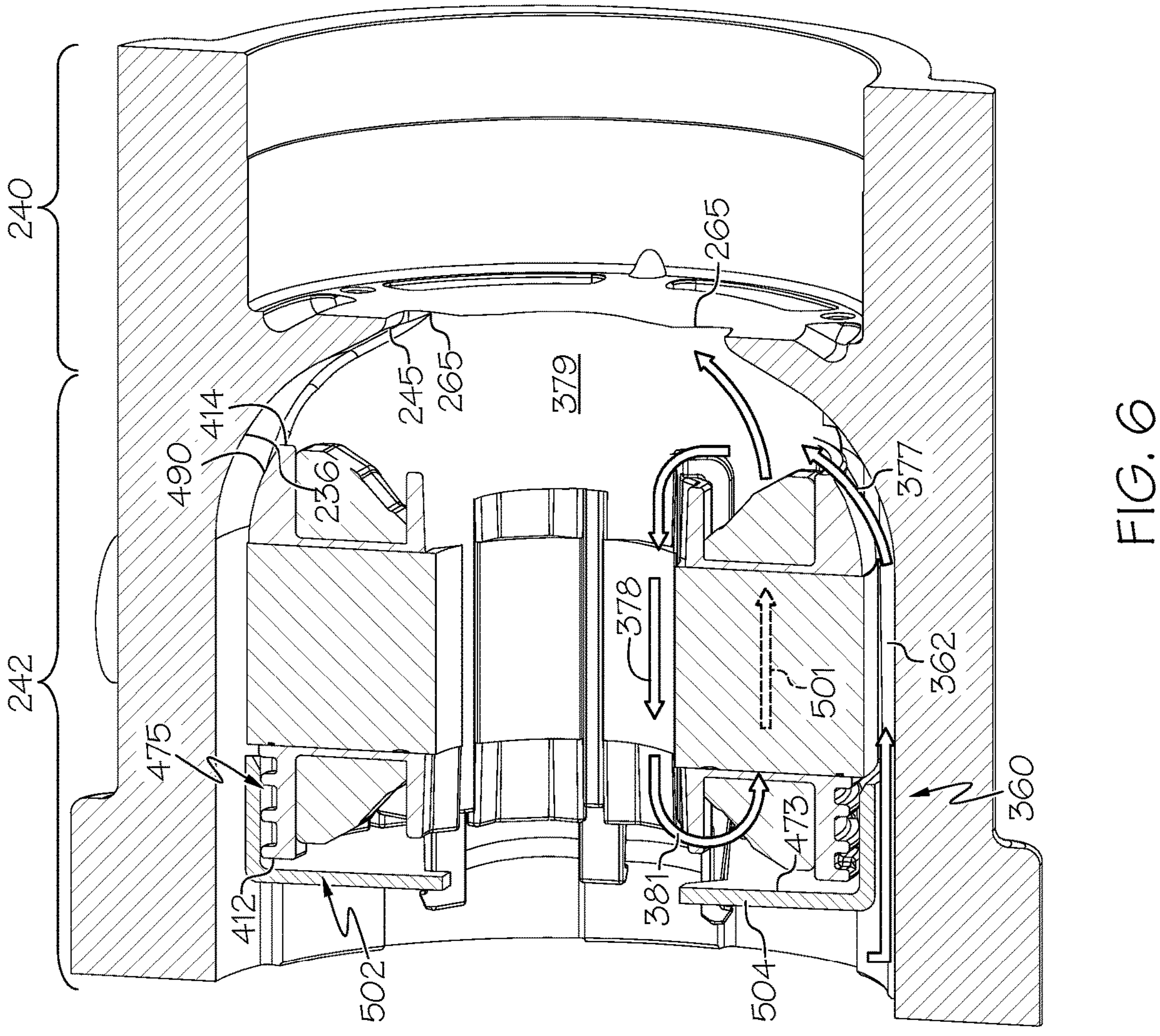
FIG. 6 is a longitudinal cross-sectional perspective view of the turbomachine taken along the line 6-6 of FIG. 4.
Figure 7:
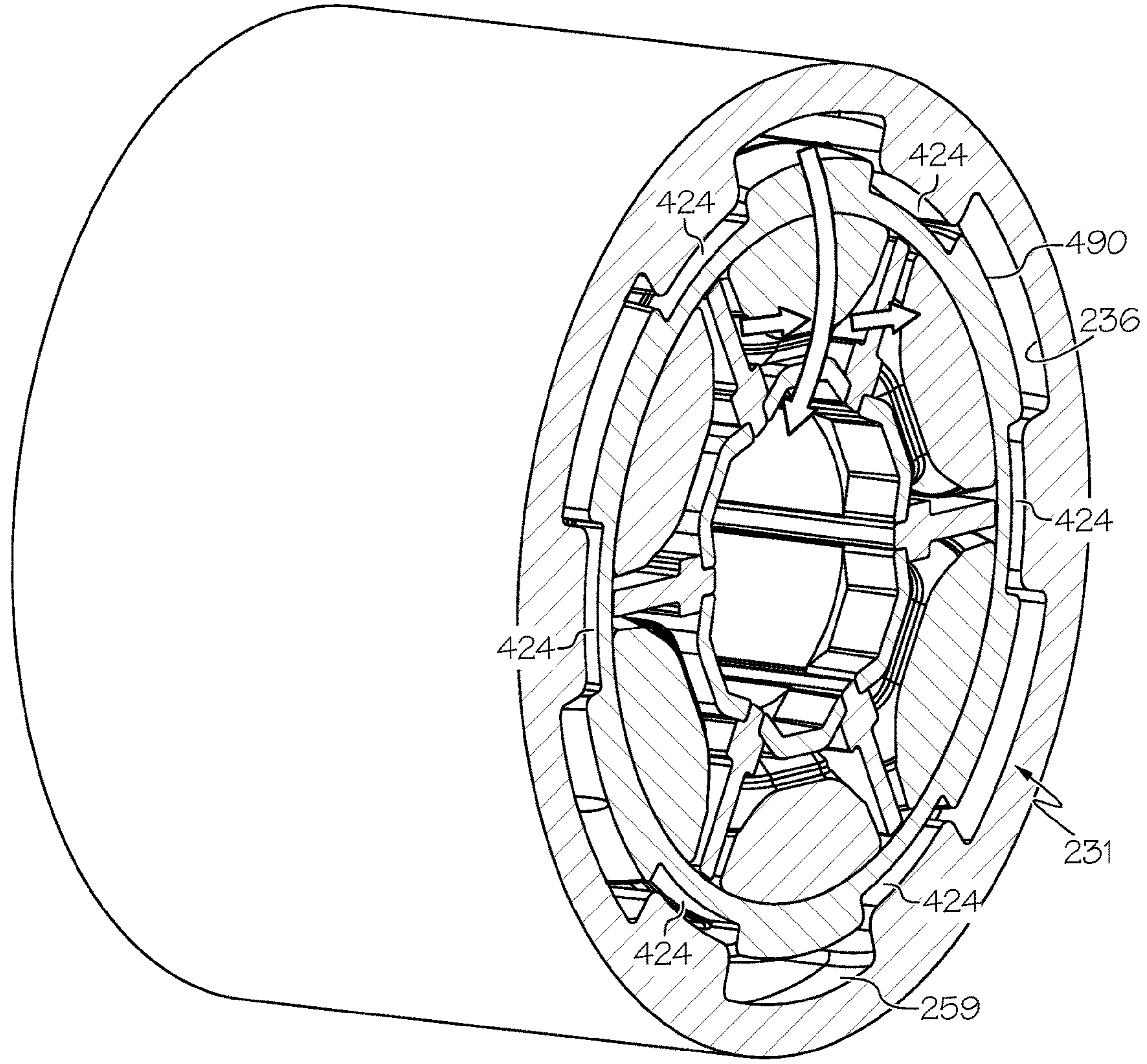
FIG. 7 is a perspective view of the turbomachine of FIG. 2 with an axial cross-sectional view included.

Furthermore, proximate the second end 245, the e-machine housing 231 may include at least one passthrough aperture 265 (FIGS. 2 and 6). There may be a plurality of passthrough apertures 265 arranged angularly about the axis 212. The passthrough apertures 265 may be holes, openings, or other apertures that extend between and that fluidly connect the e-machine cavity 233 and the compressor housing 260.

Figure 4:
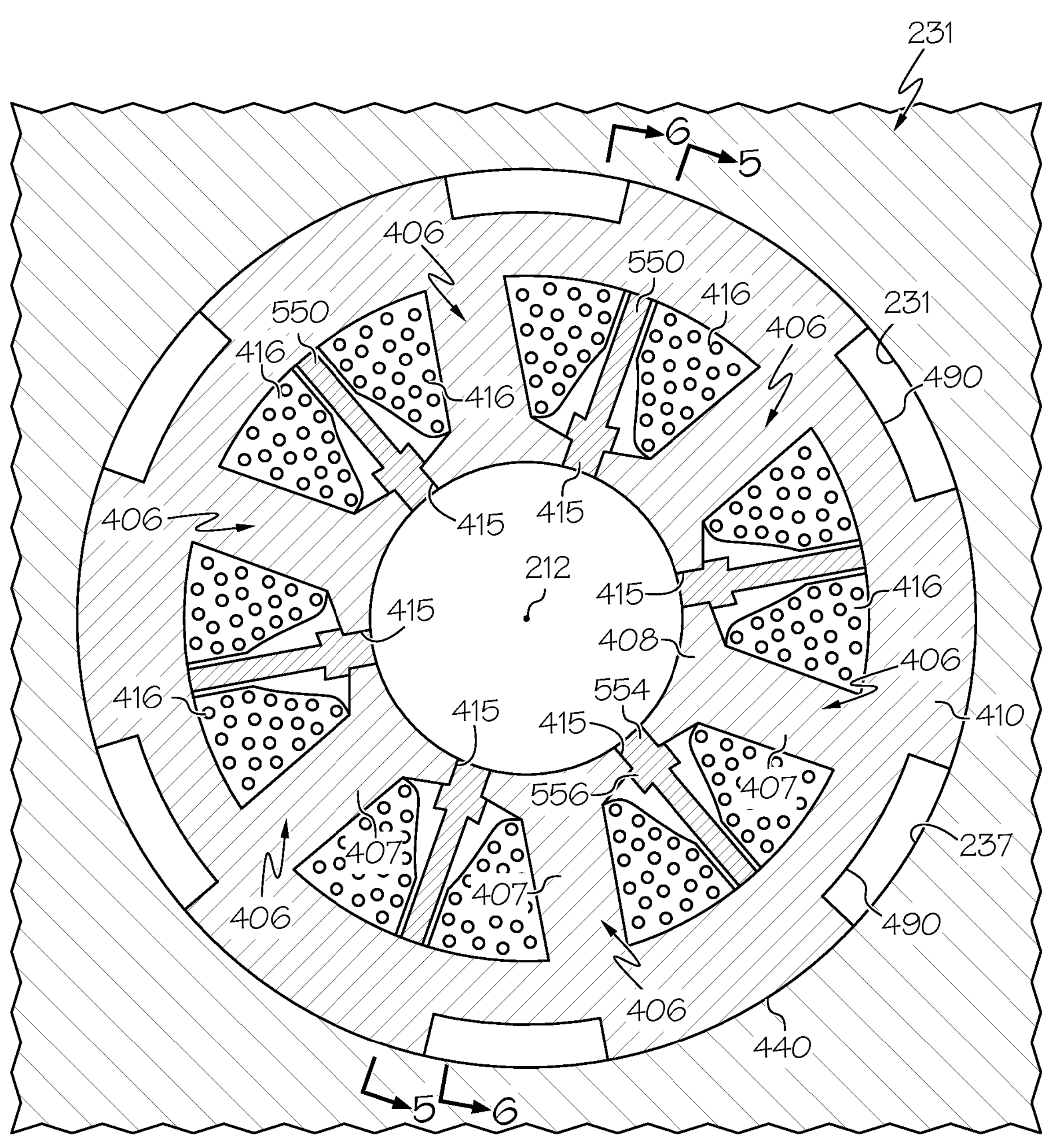
FIG. 4 is an axial cross-sectional view of the turbomachine taken along the line 4-4 of FIG. 2.

As shown in FIG. 3, the e-machine 270 may include a stator bobbin 402 of the stator member 272. The stator bobbin 402 may be spool-shaped, cylindrical and hollow so as to accommodate the rotor member 274 (FIG. 2). Accordingly, the stator bobbin 402 may include an inner radial portion 408, an outer radial portion 410, a first end 412, and a second end 414. The stator bobbin 402 may include a plurality of winding supports 406 (i.e., teeth) that are arranged in an annular arrangement about the axis 212. As shown in FIG. 4, there may be six (6) winding supports 406; however, it will be appreciated that the number of winding supports 406 may differ without departing from the scope of the present disclosure. The winding supports 406 may be joined at the outer radial portion 410 as shown in FIG. 4. Also, the stator bobbin 402 may include slots 415 between neighboring ones of the winding supports 406 on the inner radial portion 408. The slots 415 may extend along the inner radial portion 408 and along the axis 212. As shown in the cross-sectional view of FIG. 4, the winding supports 406 may also have an intermediate portion 407 included radially between the inner radial portion 408 and the outer radial portion 410. The intermediate portion 407 may have a narrower width (measured in the circumferential direction about the axis 212) than at the inner radial portion 408. Accordingly, the outer radial portion 410 may be substantially annular, and the intermediate portion 407 of the winding supports 406 may project inwardly radially toward the axis 212. At the inner radial portion 410, the winding supports 406 may be wider such that the cross-sectional profile is substantially T-shaped (FIG. 4).

The stator member 272 may further include a plurality of windings 416. The windings 416 may include a plurality of wires, etc. that are wound about the winding supports 406. The windings 416 may be wound about the intermediate portions 407 of the winding supports 406. The slots 415 may provide passage for the wires as the windings 416 are wound on the winding supports 406 during manufacture. Also, the windings 416 may include respective ends 418 (FIGS. 2 and 3) that extend away from the winding supports 406. In some embodiments, the ends 418 may be disposed at the first end 412 of the stator bobbin 402 and may extend away therefrom.

Furthermore, as shown in FIG. 2, the bobbin 402 may include, comprise, and/or may be defined by a metallic inner member 420 (i.e., a first member) and a non-metallic outer member 422 (i.e., a second member, covering member, etc.). In some embodiments, the outer member 422 may be constructed from a polymeric material or other material that is more electrically insulative than the inner member 420. Furthermore, the inner member 420 may comprise a plurality of thin laminations that are stacked along the axis 212. Additionally, in some embodiments, the outer member 422 may be over-molded onto the inner member 420 in an insert-molding process during manufacture. In other embodiments, the bobbin 402 may be additively manufactured, for example, in a 3-D printing process. The inner member 420 may be somewhat annular, hollow, and cylindrical in shape and centered about the axis 212. The inner member 420 may be axially disposed between the first end 412 and the second end 414 of the stator member 272. The outer member 422 may also be somewhat annular, hollow, and cylindrical in shape and centered about the axis 212. The outer member 422 may extend axially away from the inner member 420 to define the first end 412 of the stator bobbin 402. Also, the outer member 422 may extend axially away from the inner member 420 to define the second end 414 of the stator bobbin 402. The inner member 420 and the outer member 422 may cooperatively define the inner radial portion 408 and the outer radial portion 410. Portions of the outer member 422 may also pass through holes and/or other apertures of the inner member 420 to thereby attach the inner and outer members 420, 422 of the stator bobbin 402. Thus, the outer member 422 and the inner member 420 may cooperatively define the stator bobbin 402, including the plurality of winding supports 406. The outer member 422 and the inner member 420 may cooperatively define an outer diameter surface 440 of the stator bobbin 402, which faces outward radially from the axis 212.

Figure 5:
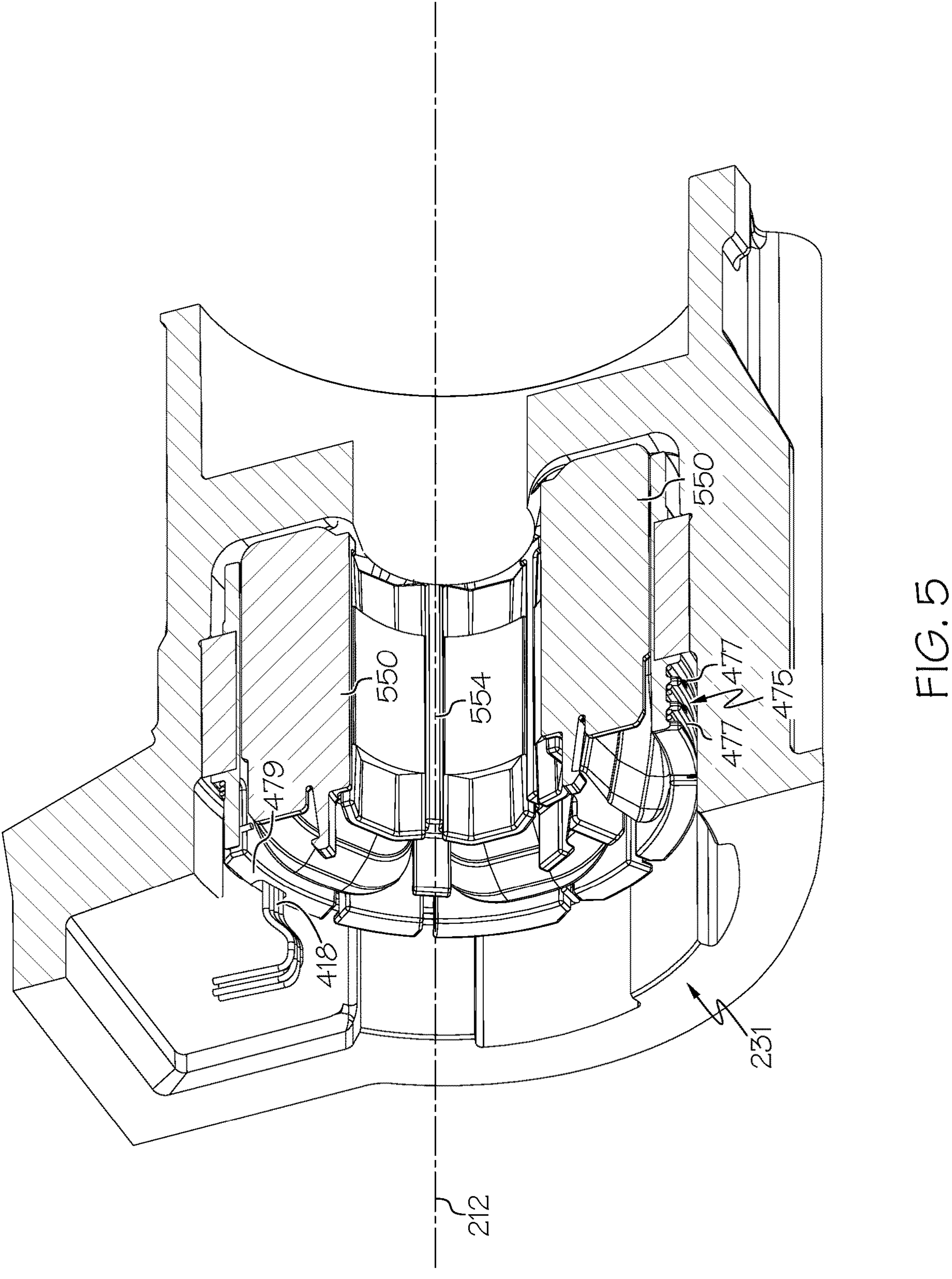
FIG. 5 is a longitudinal cross-sectional perspective view of the turbomachine taken along the line 5-5 of FIG. 4.

In some embodiments, the stator bobbin 402 may include at least one winding retainer 475 (FIGS. 3, 5, and 6). In some embodiments, the winding retainer 475 may include at least one circumferential routing portion, such as a groove 477, that extends circumferentially about the axis 212 on the outer diameter surface 440 of the stator bobbin 402. The outer member 422 may define three grooves 477 at the first end 412 of the stator bobbin 402 as shown in the illustrated embodiments. The grooves 477 may receive respective ones of the wire ends 418 of the windings 416. Thus, the ends 418 may be routed and retained securely and conveniently within the grooves 477. Furthermore, the winding retainer 475 may also include at least one terminal clasp 479 (FIGS. 3 and 5). There may be three clasps 479 as shown, and the clasps 479 may project axially from the first end 412 of the stator bobbin 402. The clasps 479 may include a respective opening 481 on the outer diameter surface 440, and the opening 481 may receive a respective terminal end 419 of the wire ends 418. Thus, the clasp 479 may securely and conveniently retain and direct the terminal end 419 away from the first end 412 of the stator bobbin 402 for attachment to the control system 220 (FIG. 2).

The stator member 272 may further include an end fluid deflector member 502. The end fluid deflector member 502 may be a thin plate with a substantially constant thickness. The end fluid deflector member 502 may include a cover plate 504, which extends normal to the axis 212, and a side lip 506 that extends annularly about the periphery of the cover plate 504. The lip 506 may be sized to fit over the first end 412 of the stator bobbin 402 and over the winding retainer 475 on the first end 412. In this position, the cover plate 504 may extend over and cover the first end 412 of the stator bobbin 402, the grooves 477, and the wire ends 418 within the grooves 477.

The cover plate 504 may also include a redirection surface 473 that faces the interior of the bobbin 402 and the winding supports 406 and windings 416 therein. The redirection surface 473 may be configured for redirecting fluid flowing through the bobbin 402. The cover plate 504 may also include a center opening 522 for the shaft 210. The center opening 522 may also include a plurality of notches 524 that are spaced apart angularly about the axis 212 such that the center opening 522 has a substantially scalloped profile. Also, the lip 506 may be interrupted in the circumferential direction by a rim opening 558. The rim opening 558 may receive the clasps 479 of the winding retainers 475 of the stator bobbin 402 when the end fluid deflector member 502 is attached to the first end 412 of the stator bobbin 402. The rim opening 558 may be configured to allow the terminal ends 419 of the windings 416 to pass from the interior of the bobbin 402 to an exterior of the bobbin 402.

Moreover, the stator member 272 may include one or more isolator barrier members 550 (FIGS. 3, 4, and 5). In some embodiments, there may be a plurality of barrier members 550 (e.g., one for each of the slots 415). Accordingly, the barrier members 550 may be spaced angularly and equally about the axis 212. As shown in FIGS. 3 and 5, the barrier member 550 may include a thin, flat plate 552 that is substantially rectangular. The barrier member 550 may also include an inner radial edge 554. As shown in FIG. 4, the inner radial edge 554 may be removably received in a respective one of the slots 415 to attach and engage to the stator bobbin 402. The barrier member 550 may include a ridge 556 providing the barrier member 550 with a cruciform cross-sectional profile that engages bobbin 402 and substantially fills the slot 415 between the neighboring winding supports 406. As shown in FIG. 3, the barrier member 550 may further include a hooked axial end 555. The hooked axial end 555 may be removably received in a respective one of the notches 524 to attach and engage to the end fluid deflector member 502 and/or to the bobbin 402. Accordingly, in this position, the barrier members 550 may extend radially between the inner radial portion 408 and the outer radial portion 410 of the stator bobbin 402 (FIG. 4). In some embodiments, an outer radial edge 557 of the barrier member 550 may nest and/or abut against the outer radial portion 410 of the stator bobbin 402.

As shown in FIGS. 2 and 3, the stator bobbin 402 may include one or more contoured flow surfaces 490. The contoured flow surfaces 490 may be included at the second end 414 on the outer diameter surface 440. The flow surfaces 490 may be contoured gradually and may be convex so as to contour inwardly toward the axis 212. In other words, at least one of the contoured flow surfaces 490 may be three-dimensionally contoured. Thus, the flow surface 490 may curve about the axis 212 (FIG. 4), and the flow surface 490 may curve convexly within a radial plane that is defined partly by the axis 212 and that is normal to the axis 212 (FIG. 2). Thus, the outer diameter surface 440 of the stator bobbin 402 may have a substantially constant radius from the first end 412 of the stator bobbin 402 and axially toward the second end 414, and along the flow surface 490, the radius of the outer diameter surface 440 may gradually reduce and taper down in size. As shown in FIG. 3, there may be a plurality of similar flow surfaces 490 that are spaced apart equally about the axis 212 on the second end 414. Furthermore, the stator bobbin 402 may include pockets 424 that are disposed angularly between the flow surfaces 490.

The stator member 272 may be received in the e-machine cavity 233, and the outer diameter surface 440 of the bobbin 402 may be nested, and abuttingly supported against the interior surface 237. As shown, the second end 414 of the bobbin 402 may be disposed adjacent the constricted second end 245 of the interior surface 237. Also, the pockets 424 may receive corresponding ones of the strips 239 of the interior surface 237 to limit the bobbin 402 against rotation relative to the housing assembly 201 (i.e., to support against relative rotation).

The shaft 210 and the other components of the rotating group 203 may also be provided using known manufacturing techniques. Also, an end plate 202 (FIG. 2) may be provided for further housing the e-machine 270. Before encapsulating the e-machine 270 and the rotating group 203 within the housing assembly 201, the terminal ends 418 may be electrically connected within respective circuits to thereby electrically and operatively connect the e-machine 270 to the control system 220 (FIGS. 2 and 5).

Referring now to FIGS. 2 and 4-7, the flow path(s) 360 through the compressor device 200 will be discussed according to example embodiments. There may be a plurality of flow path 360 that diverge and/or converge for the fluid flowing through the fluid system 102. The flow path(s) 360 may define a downstream direction, and embodiments will be discussed starting at the inlet 356 and moving in the downstream direction toward the outlet 358. In some embodiments, the downstream direction may be defined generally from the first end 412 and axially toward the second end 414. Various features of the stator member 272 may direct the flow path through the compressor device 200 for efficient cooling.

As shown in FIGS. 2 and 6, the flow path 360 may include a first outer segment 362 that is fluidly connected to the inlet 356. The first outer segment 362 may be cooperatively defined by the outer diameter surface 440 of the bobbin 402 and the base portion 238 of the interior surface 237. In other words, the first outer segment 362 may be a gap defined radially between the base portion 238 of the interior surface 237 and the outer diameter surface 440. Further downstream, the bobbin flow surfaces 490 may cooperate with opposing shroud surfaces 236 defined by the interior surface 237 to define a radial segment 377 of the flow path 360. Like the flow surfaces 490, the shroud surfaces may be three-dimensionally contoured to direct the flow path 360 radially inward as the fluid flows in the downstream direction.

The radial segment 377 may be fluidly connected downstream to a radial chamber 379 that is cooperatively defined axially between the axial end of the e-machine 270 and the constricted second end 245 of the interior surface 237. The radial chamber 379 may extend at least partly in the radial direction over the axial end of the e-machine 270. The passthrough apertures 265 (FIG. 6) may extend through the housing assembly 201 to fluidly connect the chamber 379 and the compressor stage 240. Accordingly, as shown in FIG. 6, some of the fluid in the radial chamber 379 may move axially through the passthrough apertures 265 into the compressor stage 240.

Another portion of the fluid flow in the radial chamber 379 may turn back axially and flow along a second inner segment 378 of the flow path 360. As represented in FIG. 2, the second inner segment 378 may be defined in the gap between the bobbin 402 and the rotating group 203. In some embodiments in which the bearing system 207 comprises an air bearing system, the second inner segment 378 of the flow path 360 may be routed through one or more portions of the bearing system 207 (FIG. 2). Accordingly, the flow path 360 may provide the working fluid to one or more journal members of the bearing system 207 to support against radial loading on the rotating group 203 and/or to a thrust member of the bearing system 207 to support against thrust loading on the rotating group 203. Generally though, the second inner segment 378 may define a downstream flow direction that extends axially, opposite the downstream direction of the first outer segment 362.

The second inner segment 378 may extend toward the end fluid deflector member 502. The redirection surface 473 of the cover plate 504 may redirect the flow path 560 radially outward and back along the axis 212. Accordingly, the redirection surface 473 may define a second radial segment 381, wherein the flow path 560 turns radially outward and, further downstream, axially away from the first end 412 toward the second end 414. Here, the flow path 560 may extend about the windings 416; however, downstream flow within the bobbin 402 and about the windings 416 may be generally along the axial direction from the first end 412 toward the second end 414 as represented by arrow 501 in FIG. 6. This axial flow channel 501 may be defined radially between the inner radial portion 408, the outer radial portion 410 and in the circumferential direction by the two respective barrier members 550. Flow from the axial flow channel 501 may re-join flow along the radial segment 377. Flow may exhaust from the e-machine housing 231, through the passthrough aperture 265, and into the compressor housing 260.

It will be appreciated that the working fluid may flow along the flow path 360 to directly cool the stator windings 416, the bobbin 402 and/or other portions of the e-machine 270 before the fluid passes to the compressor stage 240. The cooling may occur largely by convective heat transfer. This may be very effective cooling across a wide range of operating conditions, which may benefit operating efficiency of the e-machine 270. Also, the fluid may be routed through the bearing system 207 (e.g., an air bearing) to support rotation of the rotating group 203 relative to the housing assembly 201. The compressor device 200 may also be relatively compact, lightweight, and the part count may be relatively low. Additionally, the compressor device 200 may be manufactured, assembled, etc. efficiently.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A stator member for a directly-cooled e-machine comprising:

a bobbin formed as a one-piece member with a plurality of winding supports arranged about an axis, the bobbin including a first axial end and a second axial end spaced apart along the axis, the bobbin further including an inner radial portion and an outer radial portion that extend circumferentially about the axis and are joined by the plurality of winding supports, the plurality of winding supports including a first winding support, the first winding support including an inner radial portion, an outer radial portion, and an intermediate portion defined radially between the inner radial portion and the outer radial portion with respect to the axis;

a first isolator barrier member supported on a first angular side of the first winding support and a second isolator barrier member supported on a second angular side of the first winding support, the first and second isolator barrier members extending radially between the inner radial portion and the outer radial portion and extending substantially between the first axial end and the second axial end;

the first isolator barrier member, the inner radial portion, the second isolator barrier member, and the outer radial portion cooperatively defining an axial flow channel extending through the bobbin between the first axial end and the second axial end and circumferentially bounded by the first and second isolator barrier members; and an end fluid deflector member that is supported proximate the first axial end to define a redirection surface facing an interior of the bobbin and of the axial flow channel, the bobbin and a rotor of the e-machine cooperatively defining an inner segment of a coolant flow path that extends substantially axially along the axis in a first direction toward the redirection surface, the redirection surface configured to redirect flow at the first axial end from the inner segment radially outward and into the axial flow channel and then substantially from a first direction along the axis toward a second direction along the axis, the first direction being opposite the second direction.

2. The stator member of claim 1, wherein at least one of the first isolator barrier member and the second isolator barrier member are removably attached to the end fluid deflector member.

3. The stator member of claim 1, wherein at least one of the first isolator barrier member and the second isolator barrier member are removably attached to the bobbin.

4. The stator member of claim 1, wherein the bobbin includes a slot between the first winding support and a neighboring one of the plurality of winding supports; and wherein the first isolator barrier member is received in the slot.

5. The stator member of claim 4, wherein the slot is included between the inner radial portion and the neighboring one of the plurality of winding supports.

6. The stator member of claim 1, wherein the end fluid deflector member extends circumferentially about the axis to cover over the plurality of winding supports.

7. The stator member of claim 6, wherein the end fluid deflector member includes an opening configured to allow an end of a winding to pass from an interior of the bobbin to an exterior of the bobbin.

8. The stator member of claim 1, wherein the end fluid deflector member includes a cover plate that extends normal to the axis and that includes the redirection surface, and wherein the end fluid deflector member includes a side lip that extends from the cover plate and that fits over the first axial end of the bobbin.

9. The stator member of claim 1, wherein the end fluid deflector member includes a notch that receives the first isolator barrier member.

10. The stator member of claim 9, wherein the first isolator barrier member includes a hooked end that is received in the notch.

11. The stator member of claim 1, wherein the bobbin at least partly defines an inner segment that extends substantially axially along the axis in the first direction; and wherein the redirection surface is configured to redirect flow from the inner segment substantially from the first direction along the axis toward the second direction along the axis.

12. A turbomachine comprising:

a housing assembly;

a rotating group supported for rotation about an axis within the housing assembly;

an e-machine that is operable as at least one of an electric motor and an electric generator, the e-machine housed within the housing assembly and operatively coupled to the rotating group, the e-machine configured to attach within a fluid system that provides a fluid coolant thereto;

a stator member of the e-machine that includes:

a bobbin formed as a one piece member with a plurality of winding supports arranged about an axis, the bobbin including a first axial end and a second axial end spaced apart along the axis, the bobbin further including an inner radial portion and an outer radial portion that extend circumferentially about the axis and are joined by the plurality of winding supports, the plurality of winding supports including a first winding support, the first winding support including an inner radial portion, an outer radial portion, and an intermediate portion defined radially between the inner radial portion and the outer radial portion with respect to the axis;

a first isolator barrier member supported on a first angular side of the first winding support and a second isolator barrier member supported on a second angular side of the first winding support, the first and second isolator barrier members extending radially between the inner radial portion and the outer radial portion and extending substantially between the first axial end and the second axial end;

the first isolator barrier member, the inner radial portion, the second isolator barrier member, and the outer radial portion cooperatively defining an axial flow channel extending through the bobbin between the first axial end and the second axial end and circumferentially bounded by the first and second isolator barrier members; and an end fluid deflector member that is supported proximate the first axial end to define a redirection surface facing an interior of the bobbin, the bobbin and the rotating group cooperatively defining an inner segment of a coolant flow path that extends substantially axially along the axis in a first direction toward the redirection surface, the redirection surface configured to redirect flow at the first axial end from the inner segment radially outward and into the axial flow channel and then substantially from a first direction along the axis toward a second direction along the axis, the first direction being opposite the second direction.

13. The turbomachine of claim 12, wherein the rotating group includes a compressor wheel of a fluid compressor stage.

14. The turbomachine of claim 12, wherein the bobbin includes a slot between the first winding support and a neighboring one of the plurality of winding supports; and wherein the first isolator barrier member is received in the slot.

15. The turbomachine of claim 14, wherein the slot is included between the inner radial portion and the neighboring one of the plurality of winding supports.

16. The turbomachine of claim 12, wherein the end fluid deflector member extends circumferentially about the axis to cover over the plurality of winding supports.

17. The turbomachine of claim 12, wherein the end fluid deflector member includes a notch that receives the first isolator barrier member.

18. The turbomachine of claim 17, wherein the first isolator barrier member includes a hooked end that is received in the notch.

19. The turbomachine of claim 12, wherein the bobbin and the rotating group cooperatively define at least part of an inner segment flow path that extends substantially axially along the axis in the first direction; and wherein the redirection surface is configured to redirect flow from the inner segment flow path substantially from the first direction along the axis toward the second direction along the axis and into the axial flow channel.

20. A method of manufacturing a turbomachine comprising:

providing a housing providing a rotating group;

providing an e-machine including providing a stator bobbin;

supporting the rotating group for rotation about an axis within the housing;

housing the e-machine within the housing and operably coupling the e-machine to the rotating group to be operable as at least one of an electric motor and an electric generator;

the stator bobbin of the e-machine including:

a bobbin formed as a one-piece member with a plurality of winding supports arranged about an axis, the bobbin including a first axial end and a second axial end spaced apart along the axis, the bobbin further including an inner radial portion and an outer radial portion that extend circumferentially about the axis and are joined by the plurality of winding supports, the plurality of winding supports including a first winding support, the first winding support including an inner radial portion, an outer radial portion, and an intermediate portion defined radially between the inner radial portion and the outer radial portion with respect to the axis;

a first isolator barrier member supported on a first angular side of the first winding support and a second isolator barrier member supported on a second angular side of the first winding support, the first and second isolator barrier members extending radially between the inner radial portion and the outer radial portion and extending substantially between the first axial end and the second axial end;

the first isolator barrier member, the inner radial portion, the second isolator barrier member, and the outer radial portion cooperatively defining an axial flow channel extending through the bobbin between the first axial end and the second axial end and circumferentially bounded by the first and second isolator barrier members; and an end fluid deflector member that is supported proximate the first axial end to define a redirection surface of the axial flow channel, the redirection surface facing an interior of the bobbin, the bobbin and rotating group cooperatively defining an inner segment of a coolant flow path that extends substantially axially along the axis in a first direction toward the redirection surface the redirection surface being configured to redirect flow at the first axial end from the inner segment radially outward and into the axial flow channel and then substantially from a first direction along the axis toward a second direction along the axis, the first direction being opposite the second direction.

* * * * *